Oct. 30, 1951

W. C. KUHLMAN 2,573,029

X-RAY APPARATUS

Filed Sept. 12, 1946

2 SHEETS—SHEET 1

Inventor
William Carl Kuhlman

By
Marechal & Biebel
Attorneys

Oct. 30, 1951 W. C. KUHLMAN 2,573,029

X-RAY APPARATUS

Filed Sept. 12, 1946 2 SHEETS—SHEET 2

Inventor
William Carl Kuhlman

By

Marechal & Biebel
Attorneys

Patented Oct. 30, 1951

2,573,029

UNITED STATES PATENT OFFICE 2,573,029

X-RAY APPARATUS

William Carl Kuhlman, Cincinnati, Ohio, assignor to The Kelley-Koett Manufacturing Company, Covington, Ky., a corporation of Ohio Application September 12, 1946, Serial No. 696,565

12 Claims. (Cl. 250—95)

Figure 1:
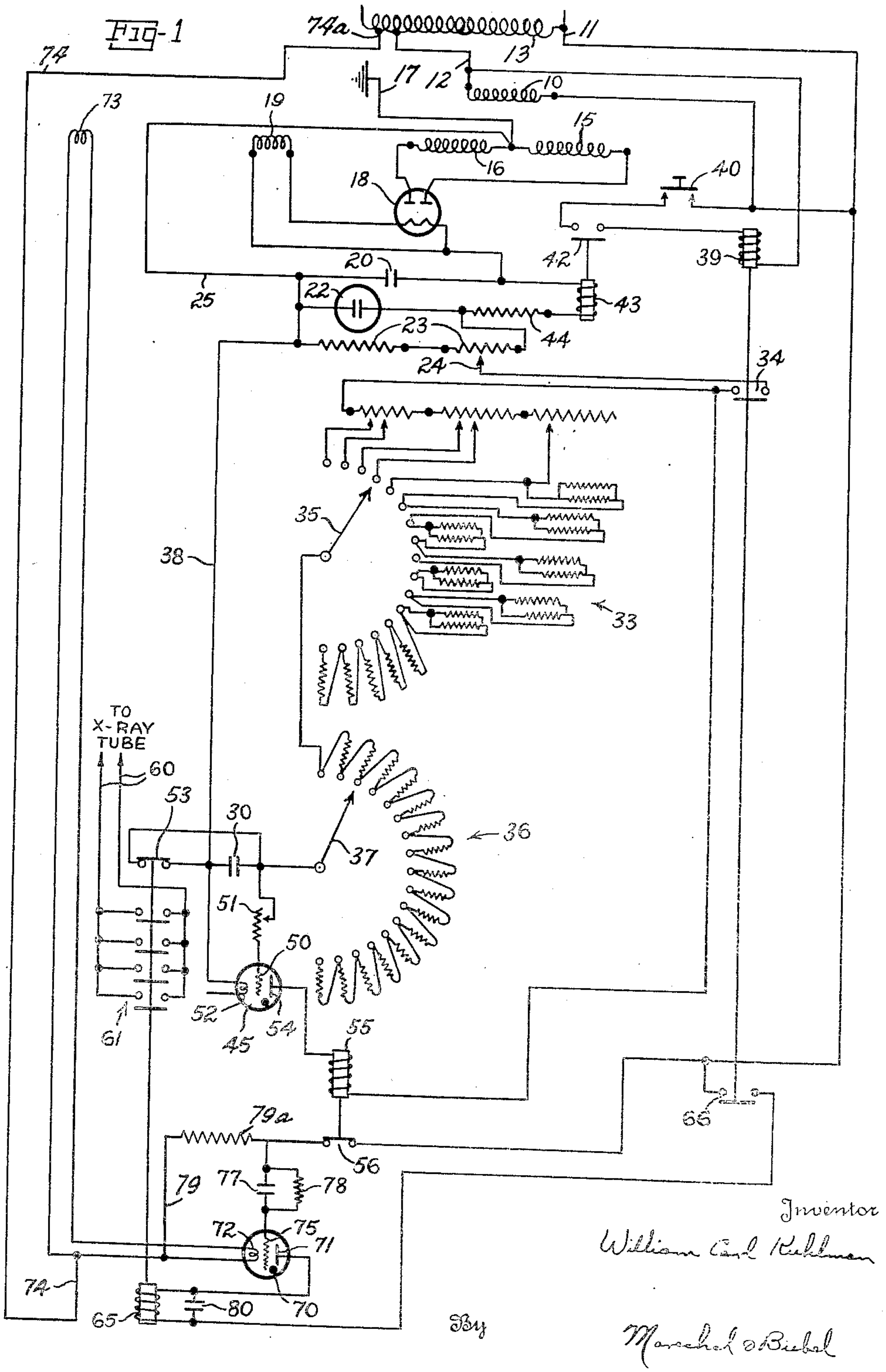

This invention relates to timing devices, and more particularly to electrical devices such as are used for controlling X-ray exposures of short duration.

The present invention has special application to electrically operated timing devices capable of use for accurately controlling the interval during which current is permitted to flow through a circuit, for example, to energize an X-ray tube for exposure purposes wherein the total exposure time is to be a relatively small fraction of a second. One type of timing device heretofore used for such purposes is a synchronous motor-driven timer wherein a synchronous motor rotates a clutch mechanism and the length of exposure is determined by the portion of a complete revolution of the clutch which is effective during the exposure cycle. Another type of such timing device is an electronic timer which functions by the time required either to charge a condenser or to discharge it through a resistance, with the voltage on the condenser controlling the firing of a gaseous triode.

It is accordingly one of the principal objects of this invention to provide a simple, reliable and highly accurate electrical timing device to assure consistently accurate timing of short time intervals and irrespective of the point in the cycle at which the control is actuated.

Another object is to provide a simple and effective control mechanism for synchronizing an electrical timing device with the circuit to be timed thereby.

Additional objects are to provide a control mechanism for electric timing devices capable of setting the timing device in operation at a predetermined point in the voltage cycle, and to provide such a control mechanism which will also terminate the timed operation at a similarly predetermined and thus accurately related point in the voltage cycle.

It is also an object of the invention to provide a control mechanism which will substantially compensate for inconsistencies in the operation of electric timing devices arising as a result of the closing of the primary timer circuit at different points in the voltage cycle or as a result of inherent inaccuracies in the timing device.

A further object is to provide such a control mechanism which is equally applicable to synchronous motor-driven timers, to electronic timers, and to like devices whose accuracy may be varied depending upon the point in the voltage cycle at which their energizing circuit is closed.

Other objects and advantages of the invention will be apparent from the following description, the accompanying drawings and the appended claims.

Figure 2:
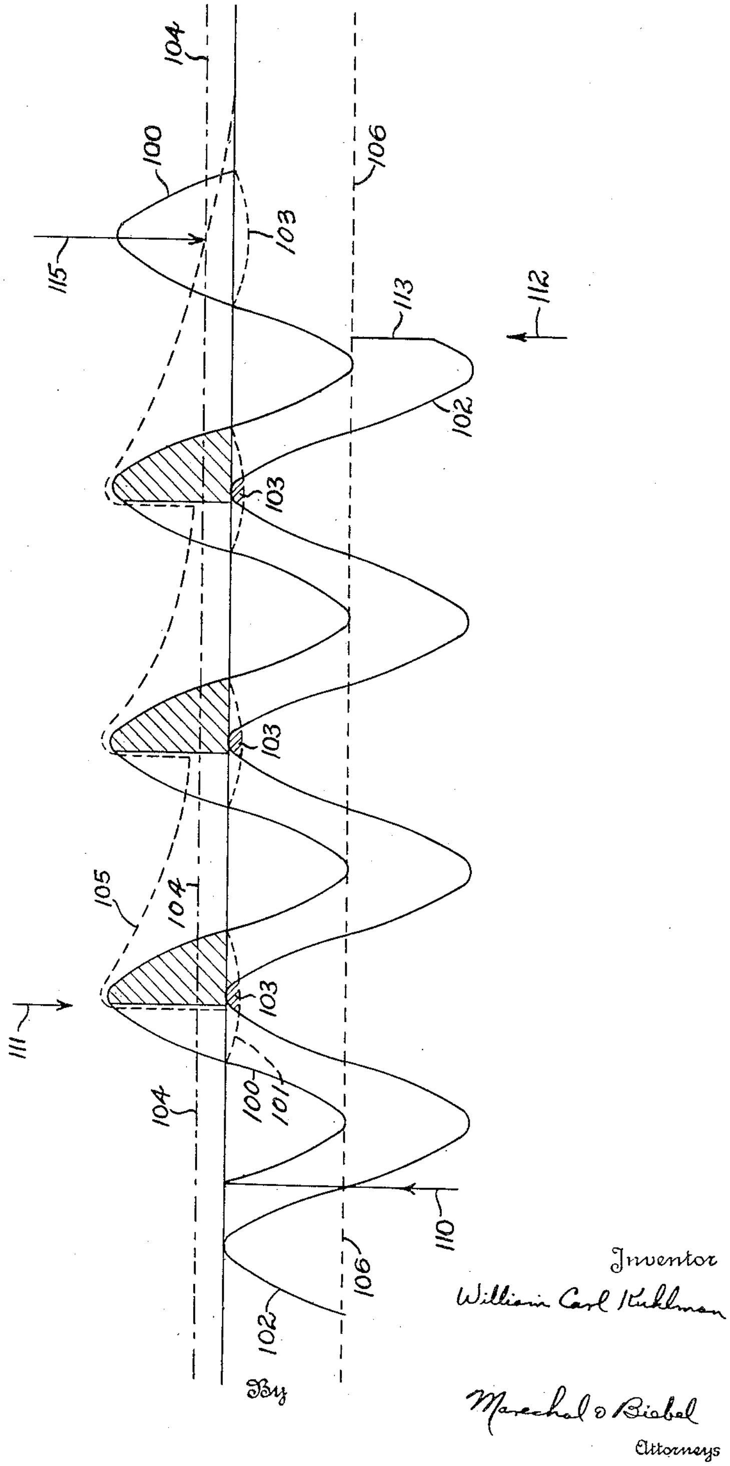

In the drawings:

Fig. 1 is a wiring diagram illustrating control mechanism in accordance with the invention applied to an electronic timing device for X-ray exposures; and Fig. 2 is a diagram illustrating the operation of the circuits shown in Fig. 1.

The invention is applicable generally to the control of timing devices whose operation is subject to variation depending upon the point in the voltage cycle at which the starting circuit is closed and including both synchronous motor-driven and electronic timers. The drawings illustrate the invention as applied to an electronic timing device for controlling the exposure times of an X-ray tube. In accordance with the invention, a gaseous triode, such as a tube of the type known as a "Thyratron," is connected in the circuit to the magnetic coil which functions to set the timer and tube in operation, and this tube is of such characteristics and so connected in the circuit that it controls the starting and stopping of the exposure to definite points in the voltage cycle which are the points at which the timer also becomes effective.

Referring to the drawings, which illustrate a preferred embodiment of the invention, circuits are provided which supply direct current for the operation of the timer. As shown, a transformer has its primary 10 connected to a suitable source 11—12 of alternating current at a voltage of, for example, 120 volts, such source being shown as a winding 13 having the taps 11 and 12 to give the desired voltage. The secondaries 15 and 16 have their adjacent ends grounded at 17 and their opposite ends connected to the anodes of a rectifier tube 18, and a third secondary winding 19 supplies current to the filaments of this tube 18.

A regulating circuit for the resulting direct current includes a condenser 20 which receives the rectified charge, a voltage regulating tube 22, and the resistors 23 which with the adjustable contact 24 form a potentiometer. This circuit is connected at 25 back to the midpoint of secondaries 15—16.

The timing mechanism comprises essentially a condenser 30 and an adjustable resistance. As shown, there are two adjustable banks of resistors. One such bank 33 is connected through a normally open switch 34 with the adjustable potentiometer contact 24. The adjustable contact 35 of resistor bank 33 is located in convenient position for operation by the operator and is connected in series with a second resistor bank 36, the steps of which are of a different order of values from those of bank 33. An adjustable contact 37 controls resistor bank 36 and is connected to one side of condenser 30, the condenser being connected on its other side through wire 38 to the voltage supply circuit.

Switch 34 controls the beginning of operation of the timing mechanism, and is operated by a magnetic coil 39 energized from power source 11—12 under control of a push button switch 40. This circuit also includes a magnetic switch 42 which is normally open and is closed when its relay coil 43 is energized. As shown, coil 43 is connected in series with resistor 44 across the D. C. voltage supply circuit so that it will be energized only when such supply circuit is energized. Thus unless power is available for supply to timing condenser 30, the push button 40 cannot cause the energizing of coil 39 and the closing of switch 34.

The charging of condenser 30 controls the firing of a gaseous triode or Thyratron tube 45 of the cold cathode type, and the latter in turn operates a switch to break the circuits to the X-ray tube. The grid 50 of tube 45 is connected through a variable resistor 51 to one side of condenser 30, and the cathode 52 is connected to the other side of condenser 30, thus providing for control by the condenser of the voltage on the grid. However, the action of this condenser is also controlled by a switch 53 connected across and adapted to short circuit the condenser when closed. The plate 54 of tube 45 is connected through a magnetic coil 55 to the switch 34 and through it to the opposite side of the D. C. power supply. This magnetic coil 55 operates when energized to open its normally closed switch contacts 56.

The main circuit to the X-ray tube is indicated at 60, and may comprise a circuit in series with the primary of the high tension transformer. It is controlled by a group of switches 61 parallel connected for greater current capacity and adapted to be closed upon the energizing of a magnetic coil 65, which coil also operates when energized to open the switch 53 short-circuiting condenser 30. One end of coil 65 is connected to the one side 11 of the main line through a normally open switch 66 controlled by magnetic coil 39. The other end of coil 65 is connected to the plate 71 of a second Thyratron tube 70. Current for the filament 72 of tube 70 is supplied by an auxiliary secondary winding 73 of the transformer 10, 15 and 16. A connection 74 is made to the tap 74a of winding 13 to provide a suitable voltage, for example, 150 volts, thus forming with line 11 a potential difference between the cathode 72 and anode 71. The grid 75 of tube 70 is connected through condenser 77 to the main line 11 and, as shown, this connection is controlled by the relay 55—56 already described, a grid leak 78 being connected across the condenser and a grid return 79 with resistor 79a therein being connected between one side of condenser 77 and the cathode 72. Magnetic coil 65 is also provided with a holding condenser 80 connected in parallel therewith, as shown.

The diagram in Fig. 2 illustrates the operation of the circuits shown in Fig. 1. In Fig. 2, the sine curve 100 represents the A. C. voltage impressed across Thyratron tube 70 when push button 40 is closed. The characteristics of this tube are such that it will pass current to its anode 71 only during the positive half-cycle and then only when the voltage on its grid 75 falls within the range indicated by the series of dotted curves 101 drawn below and opposite each of the positive half-cycles of curve 100. The sine curve 102 drawn below curve 100 represents the control voltage on grid 75 of tube 70, which is made up of the negative potential on the condenser 77, having a value represented by the line 106, and the alternating voltage supplied by line 11 through the normally closed contacts 56. This curve is illustrated at 103 as overlapping each curve 101 near the peak of alternate half-cycles to represent the interval in each cycle when the grid voltage is such as to permit the tube to fire, this interval 103 representing, as shown, only a very small fraction of an entire cycle and being shaded in the drawing for greater clarity of illustration. The dot and dash line 104 represents the voltage at which the magnetic coil 65 operating switches 53 and 61 releases to open switches 61 and close switch 53. The broken curve 105 represents the action of the holding condenser 80 connected across coil 65, and the broken line 106 repersents the voltage on condenser 77.

In operation, the resistor banks 33 and 36 are first adjusted for a predetermined interval, for example 1/20 of a second, 3 cycles of a supply circuit of 60 cycle frequency. When the operator is ready to make the desired exposure, and assuming a proper supply of D. C. power is available such that relay 43 is energized and contacts 42 are closed, he closes push button switch 40 and thus energizes magnetic coil 39 to close switches 34 and 66. This places a D. C. voltage of about 105 volts from voltage regulator tube 22 and potentiometer 23—24 across the timer resistor banks 33 and 36. However, unless magnetic coil 65 is energized, the switch 53 will remain closed and short out condenser 30, thus grounding the grid 50 of tube 45 through lines 38 and 25, reducing its potential to zero, and preventing the tube from firing. Similarly, the closing of relay 66 places about 150 volts of alternating current across Thyratron tube 70 and magnetic coil 65 but with the firing of tube 70 to complete the circuit depending upon the voltage on its grid 75.

The above conditions obtain irrespective of the point in the voltage cycle represented by curve 100 at which the push button switch is actuated except during the small fraction of each positive half-cycle represented by the overlapping portions of curves 101 and 102 at 103, which represent the interval during which the voltage on grid 75 will permit Thyratron tube 70 to fire. In other words, unless the push button switch is closed during that interval 103 of the voltage cycle, the timer will not begin to function nor will the circuits to the X-ray tube be closed until the voltage cycle reaches the next such interval. It should be noted that condenser 77 is charged all the time the apparatus is turned on, as indicated by straight broken line 106 in Fig. 2, so that the alternating current swings above and below the negative potential which has accumulated on the condenser 77.

For the purposes of this example, it may be assumed that the push button switch is closed at the point in the voltage cycle indicated by arrow 110. Accordingly, the apparatus will remain inactive until the voltage cycle reaches the beginning of the next interval during which the voltage on grid 75 will permit tube 70 to fire. When such interval is reached, indicated by arrow 111 in Fig. 2, the tube 70 will begin to pass current and will continue to do so for the remainder of that half-cycle of curve 100, as is indicated by the shaded portion of the half-cycle adjacent and to the right of arrow 111. This will immediately result in energizing magnetic coil 65, which will close switches 61 and so close the circuits to the X-ray tube to begin the exposure, the beginning of the timing period being thus accurately determined with relation to the applied A. C. power supply. At the same time switch 53 will open and permit the D. C. power supply to begin charging the condenser 30 through resistor banks 33 and 36 to establish positive potential on the grid 50 of tube 45. These conditions will hold for the remainder of the period determined by the initial adjustment of the timer resistor banks, for example 1/20 of a second as stated. This result will be obtained by reason of the fact that although tube 70 passes current only during a part of the positive half of each cycle, condenser 80 discharges through magnetic coil 65 during the remainder of each cycle and maintains the voltage through the coil above the value at which the coil becomes deenergized until tube 70 again begins to fire, as is indicated by curves 104 and 105 in Fig. 2.

When the charge on condenser 30 has accumulated sufficiently, as determined by the setting of the resistor banks, to raise the potential on grid 50 of Thyratron tube 45 to a value which will permit the tube to fire, current will pass through magnetic coil 55 to energize it and so open the switch 56 and remove the impressed alternating current from the grid 75 of Thyratron tube 70. This point is indicated by the arrow 112 in Fig. 2, and when it is reached, the voltage on grid 75 will immediately drop to only the value supplied by condenser 77, which as indicated at 113 is insufficient to permit the tube 70 to fire again. Therefore, when the current flow through magnetic coil 65 supplied by the discharging of condenser 80 falls below the level necessary to retain the coil in actuated position, the switches 61 will open and terminate the X-ray tube exposure. This point in the cycle is determined by the discharge voltage of condenser 80 and the voltage for the particular coil 65, and these parts may be selected to provide a desired curve 105 such that the coil will remain actuated during the inactive half-cycle of the tube 70 but will open at a predetermined point in the subsequent cycle. This point is indicated by arrow 115 in Fig. 2, and it will be noted that the condenser and coil have been so chosen that the interval between arrow 115 and the arrow 111, which indicates the beginning of the exposure, accurately approximates the 3 cycles or 1/20 of a second as predetermined.

It will accordingly be seen that by means of the invention the circuit which sets the timer in operation and the circuit, such as to the X-ray tube, to be controlled by the timer are completed at the same instant, by the simultaneous opening of switch 53 and closing of switches 61. Also, the instant at which these switches are operated is controlled to within a definite interval in the voltage cycle, which is a very small fraction of the entire cycle, as illustrated by the overlapping portions of curves 101 and 102, and which is so located in the cycle as to insure that the operation of the timer will be synchronized to begin simultaneously with the operation to be timed thereby. Thus, irrespective of the point in the voltage cycle between the two overlapping portions of curves 101 and 102 adjacent arrow 110 at which the push button switch is closed, neither the timer nor the X-ray tube is set in operation until the point indicated by arrow 111 is reached, and then both are started simultaneously. In this way, inconsistencies which could otherwise occur as a result of variation in the points in the voltage cycle at which the push button is pressed are eliminated, and the invention assures that the start of every exposure will be accurately synchronized with the timing device.

The invention similarly provides for terminating each exposure at a definite point in the voltage cycle, which is the point at which the current supplied through coil 65 by condenser 80 falls below the level necessary to retain the coil in actuated position and may be selected as explained. Furthermore, this result is obtained irrespective of the point in the cycle at which the action of the primary timer terminates. Thus in the example explained in connection with Fig. 2, the timer may function to open switch 56 at any point between arrow 115 and the preceding peak of curve 100 without affecting the length of the exposure, which terminates at the point represented by arrow 115, as described. Thus in accordance with the invention, the exposures will be in terms of whole cycles within the limits of the firing range of the Thyratron tube 70, plus whatever definite fraction, if any, of a cycle the condenser 80 actuates coil 65 beyond the cycle during which the primary timer action terminates. Since this range is narrow, as shown, the consistency for exposures of the magnitude discussed will be well within the requirements for radiographic procedures using exposures of such duration.

The invention also compensates for inconsistencies in the operation of the primary timer itself to give more consistent results. Thus as described, the exposure time will remain the same even though the action of the primary timer terminates at another point during the last cycle. That is, if the primary timer is still in operation during the interval 103 at the peak of each cycle, the exposure will continue throughout that cycle even though the action of the primary timer terminates before the cycle is completed. Furthermore, if the primary timer is set for an interval one half-cycle less than the desired exposure time, i. e. 2½ cycles in the above specific example, the apparatus will still provide the desired 3-cycle exposure even if the primary timer is not accurate to less than plus or minus one half-cycle, thus allowing for a margin of error of substantially one whole cycle in the primary timer without affecting the accuracy of the apparatus as a whole. Since such primary timers are readily made accurate to within plus or minus one half-cycle, the desired effective accuracy may be conveniently attained in practice by so calibrating the adjusting means as to provide for actual adjustment of the timer to one half-cycle less than the indicated interval, as explained above.

Thus the present invention provides means for controlling the starting and stopping of electrical timing devices which are initially set in operation by the closing of a circuit which may take place at an indefinite point in the voltage cycle, and not only for synchronizing the timer with the operation to be timed, but also limiting the start of the operation to a properly effective point in the voltage cycle. The invention provides for compensating not only for inconsistencies arising as a result of variations in the point in the voltage cycle at which the initial control circuit is closed, but also for substantial inaccuracies in the timer device per se. Thus with the invention, the start of the exposure time is at a definite point in the voltage cycle, and this point is such that the timer simultaneously becomes effective, and these results are obtained irrespective of the point at which the push button switch is closed. In addition, inaccuracies in the timer within a range of approximately one cycle will not appreciably affect the accuracy of the timed interval, and inaccuracies of a greater range will result in altering the exposure by a corresponding number of whole cycles and can readily be determined and allowance made therefor.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an X-ray apparatus adapted to be provided with an alternating current source of voltage and including an X-ray tube and a main electric circuit for energizing said tube, control mechanism for said tube comprising an electrical timing device for controlling the interval during which said main circuit is closed, a magnetic switch including means connected with said main circuit and said timing device for closing and opening said main circuit and for simultaneously starting and stopping respectively said timing device, a circuit adapted to be supplied from said voltage source for energizing said magnetic switch, means operated by said timing device controlling the interval during which said main circuit is closed by opening and closing said energizing circuit, and means in said energizing circuit for causing the closing of said energizing circuit to occur in a predetermined portion of a cycle of the voltage from said source and for causing the opening of said energizing circuit to occur in a predetermined portion of a subsequent cycle of said voltage.

2. In an X-ray apparatus to be provided with an alternating current source of voltage and including an X-ray tube and a main electric circuit for energizing said tube, control mechanism for said tube comprising an electrical timing device for controlling the interval during which said main circuit is closed, a magnetic switch including means connected with said main circuit and said timing device for closing and opening said main circuit and for simultaneously starting and stopping respectively said timing device, a circuit adapted to be supplied from said voltage source for energizing said magnetic switch, means operated by said timing device for controlling the interval during which said main circuit is closed by opening and closing said energizing circuit, and means in said energizing circuit for causing the closing of said energizing circuit to occur in a predetermined portion of the cycle of the voltage from said source and for causing the opening of said energizing circuit to occur in substantially the same predetermined portion of a subsequent cycle of said voltage to control the interval during which said main circuit is closed to a substantially integral number of cycles.

3. In an X-ray apparatus adapted to be provided with an alternating current source of voltage and including an X-ray tube and a main electric circuit for energizing said tube, control mechanism for said tube comprising an electrical timing device for controlling the interval during which said main circuit is closed, a magnetic switch including means connected with said main circuit and said timing device for closing and opening said main circuit and for simultaneously starting and stopping respectively said timing device, a circuit adapted to be supplied from said voltage source for energizing said magnetic switch, means operated by said timing device for controlling the interval during which said main circuit is closed by opening and closing said energizing circuit, and means in said energizing circuit for causing said energizing circuit to open and close only at substantially the peak of a cycle of the voltage from said source to control the interval during which said main circuit is closed to a substantially integral number of cycles.

4. In an X-ray apparatus adapted to be provided with an alternating current source of voltage and including an X-ray tube and a main electric circuit for energizing said tube, control mechanism for said tube comprising an electrical timing device for controlling the interval during which said main circuit is closed, a magnetic switch including means connected with said main circuit and said timing device for closing and opening said main circuit and for simultaneously starting and stopping respectively said timing device, a circuit for energizing said magnetic switch, a primary circuit for controlling said energizing circuit, means for supplying voltage from said source to both said primary and said energizing circuits, and means in said energizing circuit preventing the closing thereof except at substantially the peak of a cycle of the voltage from said source irrespective of the point in said cycle at which said primary circuit is closed.

5. In an X-ray apparatus adapted to be provided with an alternating current source of voltage and including an X-ray tube and a main electric circuit for energizing said tube, control mechanism for said tube comprising an electrical timing device for controlling the interval during which said main circuit is closed, a magnetic switch including means connected with said main circuit and said timing device for closing and opening said main circuit and for simultaneously starting and stopping respectively said timing device, a circuit adapted to be supplied from said voltage source for energizing said magnetic switch, means in said energizing circuit actuated by said timing device for terminating the interval during which said main circuit is closed by opening said energizing circuit, and means in said energizing circuit preventing the opening thereof except at a predetermined portion of the cycle of the voltage from said source irrespective of the point in said cycle at which said timing device actuates said circuit opening means.

6. In an X-ray apparatus adapted to be provided with an alternating current source of voltage and including an X-ray tube and a main electric circuit for energizing said tube, control mechanism for said tube comprising an electrical timing device for controlling the interval during which said main circuit is closed, a magnetic switch including means connected with said main circuit and said timing device for closing and opening said main circuit and for simultaneously starting and stopping respectively said timing device, a circuit adapted to be supplied from said voltage source for energizing said magnetic switch to effect closing of said main circuit, and means in said energizing circuit for causing the closing of said main circuit to occur in a predetermined portion of the cycle of the voltage from said source such that the starting of said timing device will be synchronized with the closing of said main circuit irrespective of the point in said voltage cycle at which current is first supplied to said energizing circuit.

7. In an X-ray apparatus adapted to be provided with an alternating current source of voltage and including an X-ray tube and a main electric circuit for energizing said tube, control mechanism for said tube comprising an electrical timing device for controlling the interval during which said main circuit is closed, a magnetic switch including means connected with said main circuit and said timing device for closing and opening said main circuit and for simultaneously starting and stopping respectively said timing device, a circuit adapted to be supplied from said voltage source for energizing said magnetic switch, a gaseous triode in said energizing circuit, means for controlling the grid voltage of said triode to determine the portion of the voltage cycle at which said energizing circuit is closed and opened, and a condenser connected in said energizing circuit in parallel with the windings of said magnetic switch for maintaining said switch closed during inactive half-cycles of said triode.

8. Control mechanism for a main electric circuit adapted to be provided with an alternating current source of voltage, comprising an electrical timing device for controlling the interval during which said main circuit is closed, means including a magnetic switch having contacts in circuit with said timing device for setting said device in operation, said switch having means connected with said main circuit and said timing device for closing and opening said main circuit and simultaneously starting and stopping respectively said timing device, a circuit adapted to be supplied from said voltage source for energizing said switch, a gaseous triode in said energizing circuit, a primary circuit adapted to be supplied from said voltage source for controlling the grid voltage of said triode to determine the portions of the cycle of the voltage from said source at which said energizing circuit is closed and opened, and a condenser connected in said energizing circuit in parallel with the windings of said magnetic switch for maintaining said switch closed during inactive half-cycles of said triode.

9. Control mechanism for a main electric circuit adapted to be provided with an alternating current source of voltage, comprising an electrical timing device for controlling the interval during which said main circuit is closed, means including a first magnetic switch having contacts in circuit with said timing device for setting said device in operation, said switch also having means connected with said main circuit and said timing device for closing and opening said main circuit and for simultaneously starting and stopping respectively said timing device, a circuit for energizing said switch, a primary circuit for controlling said energizing circuit, means for supplying voltage from said source to both said primary and energizing circuits, a gaseous triode in said energizing circuit having the grid thereof connected with said primary circuit to effect closing of said energizing circuit only at substantially a peak of a cycle of the voltage from said source irrespective of the point in said cycle at which said primary circuit is closed, a second magnetic switch having the coil thereof in circuit with said timing device and adapted to be energized therethrough, said second switch having the contacts thereof in circuit with said grid for disconnecting the connection between said grid and said primary circuit when said second switch is energized, and a condenser connected in said energizing circuit in parallel with the windings of said first switch for maintaining said first switch closed during inactive half-cycles of said triode.

10. Control mechanism for a main electric circuit comprising an electrical timing device including a first gaseous triode and a condenser connected with the grid of said triode, a magnetic switch having means connected with said main circuit for closing said main circuit when said switch is energized. said switch also having means connected with said timing device for short circuiting said condenser and preventing operation of said timing device when said switch is deenergized, a circuit for energizing said switch, a primary circuit for controlling said energizing circuit, means for supplying alternating current voltage from a common source to said primary and energizing circuits, a second gaseous triode in said energizing circuit having the grid thereof connected with said primary circuit to effect closing of said energizing circuit only at substantially a peak of a cycle of the voltage from said source irrespective of the point in said cycle at which said primary circuit is closed, a condenser connected in said energizing circuit in parallel with the windings of said magnetic switch for maintaining said switch closed during inactive half-cycle of said second triode, and a second magnetic switch having the coil thereof in circuit with said first triode for energizing upon the firing of said first triode and having the contacts thereof in circuit with the grid of said second triode to disconnect said connection to said grid upon energizing of said coil thereof preventing further firing of said second triode.

11. In combination with an electric timer device for controlling a work circuit, a first control circuit adapted to be supplied from a source of alternating current voltage, an electronic tube in said control circuit responsive to a predetermined instantaneous peak value of said voltage, a magnetic relay including cooperating contacts connected in said work circuit to control said work circuit when said relay is energized, means responsive to operation of said tube for energizing said relay, a second control circuit for said timer device including additional cooperating contacts actuated by said relay to start said timer device when said magnetic relay is energized, a switch in said first control circuit, means operated by said timer device for operating said switch to open said first control circuit, and a condenser connected in parallel with the windings of said relay to maintain said relay energized for a predetermined interval after said first control circuit is opened and thus to maintain said contacts in said work circuit in said operated relation for said predetermined interval.

12. In combination with an electric timer device for controlling a work circuit, a magnetic relay including cooperating contacts connected in said work circuit to control said work circuit, a first control circuit adapted to be supplied from a source of alternating current voltage, a second control circuit adapted to be supplied from said source of voltage for energizing said relay and including an electronic tube connected in said first control circuit responsive to a predetermined instantaneous value of said voltage in said first control circuit, a third control circuit for said timer device including additional cooperating contacts actuated by said relay to start said timer device when said relay is energized, a switch in said second control circuit, means operated by said timer device for operating said switch to open said second control circuit, and a condenser connected in parallel with the windings of said relay to maintain said contacts in said work circuit in said operated relation for a predetermined interval after said second control circuit is opened.

WILLIAM CARL KUHLMAN.

REFERENCES CITED

The following references are of record in the file of this patent:

UNITED STATES PATENTS

| Number | Name | Date |
|---|---|---|
| 1,592,613 | Meyer | July 13, 1926 |
| 2,008,413 | Dawson | July 16, 1935 |
| 2,024,542 | Simon | Dec. 17, 1935 |
| 2,335,014 | Kerst | Nov. 23, 1943 |
| 2,339,750 | Bartholy | Jan. 25, 1944 |
| 2,412,571 | Few | Dec. 17, 1946 |
| 2,433,254 | Aiken | Dec. 23, 1947 |
| 2,453,486 | Ball | Nov. 9, 1948 |